US008670983B2

(12) United States Patent
Garland et al.

(10) Patent No.: US 8,670,983 B2
(45) Date of Patent: Mar. 11, 2014

(54) SPEECH SIGNAL SIMILARITY

(75) Inventors: Jacob B. Garland, Marietta, GA (US); Jon A. Arrowood, Smyrna, GA (US); Drew Lanham, Menlo Park, CA (US); Marsal Gavalda, Sandy Springs, GA (US)

(73) Assignee: Nexidia Inc., Atlanta, GA (US)

( * ) Notice: Subject to any disclaimer, the term of this patent is extended or adjusted under 35 U.S.C. 154(b) by 102 days.

(21) Appl. No.: 13/221,270

(22) Filed: Aug. 30, 2011

(65) Prior Publication Data

US 2012/0059656 A1 Mar. 8, 2012

Related U.S. Application Data

(60) Provisional application No. 61/379,441, filed on Sep. 2, 2010.

(51) Int. Cl.
*G10L 15/04* (2013.01)

(52) U.S. Cl.
USPC ............................ 704/254; 704/243; 704/244

(58) Field of Classification Search
USPC ......... 704/231, 251, 254, 235, 240, 243, 244, 704/245, 249, 250
See application file for complete search history.

(56) References Cited

U.S. PATENT DOCUMENTS 6,230,129 B1 * 5/2001 Morin et al. .................. 704/254
6,243,713 B1 * 6/2001 Nelson et al. ......................... 1/1
6,526,335 B1 * 2/2003 Treyz et al. ........................ 701/1
7,983,915 B2 * 7/2011 Knight et al. ................. 704/254
2003/0204399 A1 * 10/2003 Wolf et al. .................... 704/251
2006/0015339 A1 * 1/2006 Charlesworth et al. ....... 704/251
2007/0299671 A1 * 12/2007 McLachlan et al. .......... 704/500
2008/0249982 A1 * 10/2008 Lakowske ......................... 707/3
2009/0037174 A1 * 2/2009 Seltzer et al. ................. 704/251

OTHER PUBLICATIONS

Kenney Ng;Victor W. Zue, Subword Unit Representations for Spoken Document Retrieval, 1997, Eurospeech, pp. 1-4.*

* cited by examiner

*Primary Examiner* — Huyen X. Vo
(74) *Attorney, Agent, or Firm* — Occhiuti & Rohlicek LLP

(57) ABSTRACT

A method for determining a similarity between a first audio source and a second audio source includes: for the first audio source, determining a first frequency of occurrence for each of a plurality of phoneme sequences and determining a first weighted frequency for each of the plurality of phoneme sequences based on the first frequency of occurrence for the phoneme sequence; for the second audio source, determining a second frequency of occurrence for each of a plurality of phoneme sequences and determining a second weighted frequency for each of the plurality of phoneme sequences based on the second frequency of occurrence for the phoneme sequence; comparing the first weighted frequency for each phoneme sequence with the second weighted frequency for the corresponding phoneme sequence; and generating a similarity score representative of a similarity between the first audio source and the second audio source based on the results of the comparing.

15 Claims, 4 Drawing Sheets

Fig. 3
applications
cisco technology
cisco's technology
information
more information
payment card industry
services
technology
unified communications
unified work-space licensing
customers
solution
unified communication
architecture
cisco unified
communications manager
solutions marketing
cisco learning network
organization
contact center
individual
unity connection

300

SPEECH SIGNAL SIMILARITY

CROSS-REFERENCE TO RELATED APPLICATIONS

This application claims priority to U.S. Provisional Application Ser. No. 61/379,441, filed Sep. 2, 2010, the contents of which are incorporated herein by reference.

BACKGROUND

The ability to measure or quantify similarity between the spoken content of two segments of audio can provide meaningful insight into the relationship between the two segments. However, apart from creating a time-aligned text transcript of the audio, this information is largely inaccessible. Speech-to-text algorithms require dictionaries, are largely inaccurate, and are fairly slow. Human transcription, while accurate, is time-consuming and expensive. In general, low-level, feature-extraction based approaches for identifying similarities between audio files search for audio duplications.

SUMMARY

In a general aspect, a method for determining a similarity between a first audio source and a second audio source includes, for the first audio source, performing the steps of: determining, using an analysis module of a computer, a first frequency of occurrence for each of a plurality of phoneme sequences in the first audio source; and determining, using the analysis module, a first weighted frequency for each of the plurality of phoneme sequences based on the first frequency of occurrence for the phoneme sequence. The method further includes, for the second audio source, performing the steps of: determining, using the analysis module, a second frequency of occurrence for each of a plurality of phoneme sequences in the second audio source; and determining, using the analysis module, a second weighted frequency for each of the plurality of phoneme sequences based on the second frequency of occurrence for the phoneme sequence. The method also includes comparing, using a comparison module of a computer, the first weighted frequency for each phoneme sequence with the second weighted frequency for the corresponding phoneme sequence; and generating, using the comparison module, a similarity score representative of a similarity between the first audio source and the second audio source based on the results of the comparing.

Embodiments may include one or more of the following.

Determining the first frequency of occurrence includes, for each phoneme sequence, determining a ratio between a number of times the phoneme sequence occurs in the first audio source and a duration of the first audio source.

The first weighted frequencies for each first portion of audio are collectively represented by a first vector and the second weighted frequencies for each second portion of audio are collectively represented by a second vector. The step of comparing includes determining a cosine of an angle between the first vector and the second vector.

The step of comparing includes using a latent semantic analysis technique.

The first audio source forms a part of a first audio file and the second audio source forms a part of a second audio file. The first audio source is a first segment of an audio file and the second audio source is a second segment of the audio file.

The method further includes selecting the plurality of phoneme sequences. The plurality of phoneme sequences are selected on the basis of a language of at least one of the first audio source and the second audio source.

Each phoneme sequence includes three phonemes. Each phoneme sequence includes a plurality of words. The method further includes determining a relevance score for each word in the first audio source. The relevance score for each word is determined based on a frequency of occurrence of the word in the first audio source.

In another general aspect, a method for determining a similarity between a first audio source and a second audio source includes generating, using a computer, a phonetic transcript of the first audio source, the phonetic transcript including a list of phonemes occurring in the first audio source; and searching the second audio source for each phoneme included in the phonetic transcript using the computer. The method further includes generating, using the computer, an overall search result for the second audio source, the overall search result including results from the searching; and generating, using the computer, a score representative of a similarity between the first audio source and the second audio source, the score based on the overall search result.

Embodiments may include one or more of the following.

The phonetic transcript includes a sequential list of phonemes occurring in the first audio source.

In a further general aspect, a method includes comparing an audio track of a first multimedia source with an audio track of a second multimedia source, the second multimedia source being associated with text content corresponding to closed captioning; determining a similarity score representative of a similarity between the audio track of the first multimedia source and the audio track of the second multimedia source based on the results of the comparing; and associating at least some of the text content corresponding to the closed captioning with the first multimedia source if the determined similarity score exceeds a predefined threshold.

Embodiments may include one or more of the following.

Associating at least some of the text content includes extracting text content including the closed captioning from the second multimedia source.

In another general aspect, a method includes processing signals received over a plurality of channels, each channel being associated with a distinct one of a set of geographically dispersed antennas, to determine a similarity score representative of a similarity between pairs of the received signals; and, for each pair of the received signals having a determined similarity score that exceeds a predefined threshold, determining whether the received signals of the pair are time aligned, and if so, removing from further processing one of the received signals of the pair.

Embodiments may include one or more of the following.

At least some of the received signals correspond to distress calls, and wherein the signals are processed at a computing system in electronic communication with an emergency response provider.

The systems and methods described herein have a number of advantages. For instance, these approaches are capable of identifying similar spoken content in spite of slight variations in content, or speaker, or accent.

Other features and advantages of the invention are apparent from the following description and from the claims.

DETAILED DESCRIPTION

Figure 1:
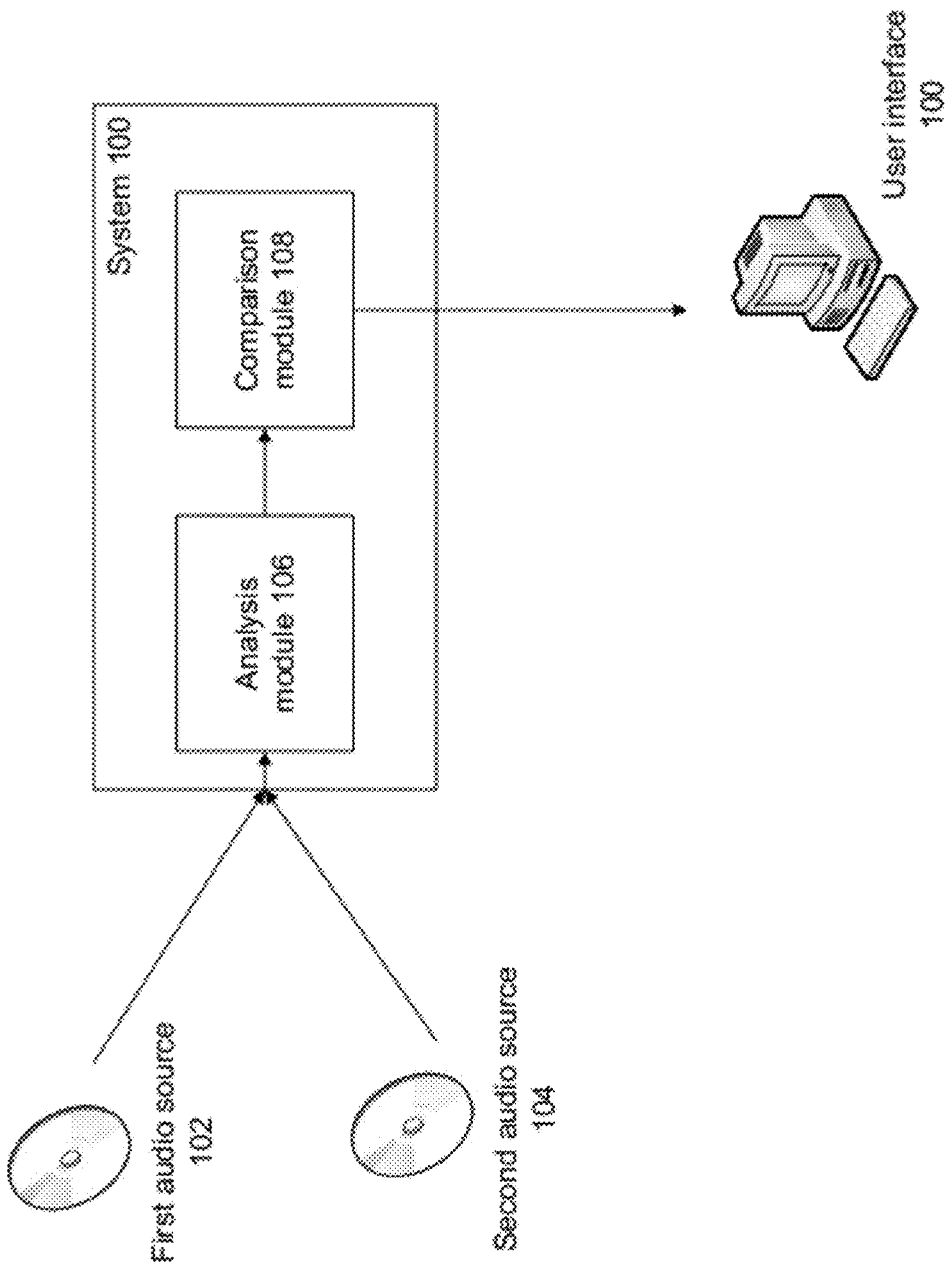
FIG. 1 is a block diagram of a system for determining phonetic similarity.

Referring to FIG. 1, in one example of a speech similarity system 100, phonetic similarity between a first source of audio 102 and a second source of audio 104 is used as a basis for determining similarity of speech segments. The first source of audio 102 and the second source of audio 104 may be two separate audio or media files or may be two different sections of the same audio file. An analysis module 106 analyzes the phonetic content of first source of audio 102 and second source of audio 104. Based on the analyzed phonetic content, a comparison module 108 calculates a similarity metric indicative of a degree of similarity between the first source of audio 102 and the second source of audio 104. In some instances, the similarity metric is displayed or otherwise outputted on a user interface 110.

1 Phoneme Sequence Approach to Determining Phonetic Similarity

In a phoneme sequence approach to determining phonetic similarity, an audio file (or a portion thereof) is searched using a list of three-phoneme sequences. Using these results, an index is created that represents a 'fingerprint' of the phonetic information present in the searched audio. The index can then be used to detect and quantify similarities between audio files or portions of audio files.

1.1 Phoneme Sequence-Based Analysis

Figure 2:
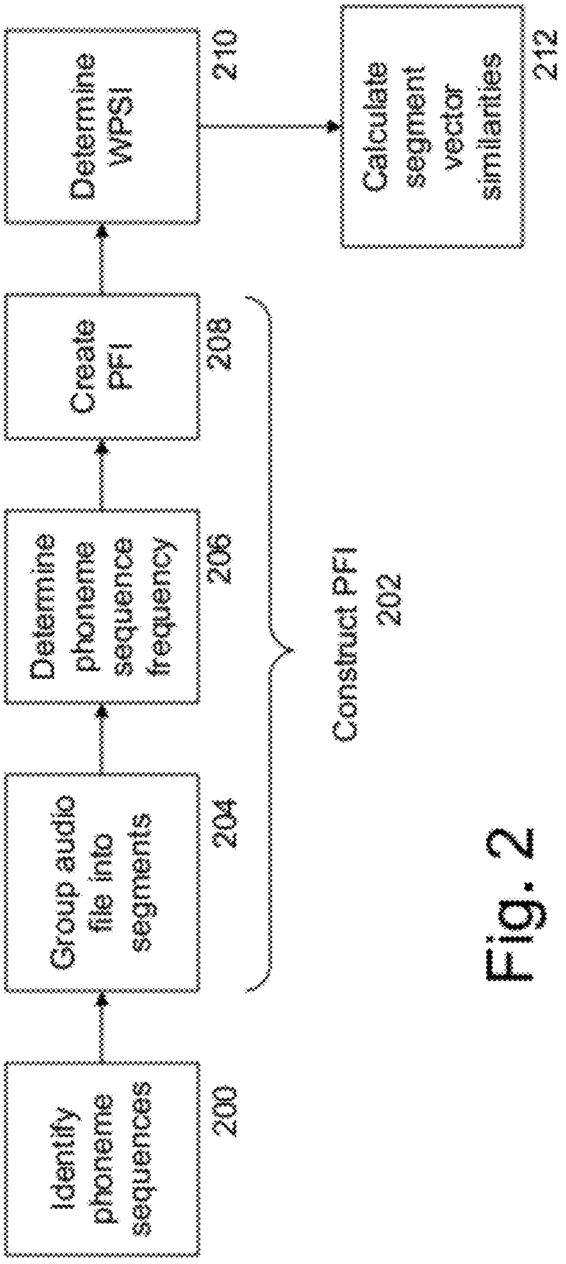
FIG. 2 is a flow chart of a phoneme sequence approach to determining phonetic similarity.

Referring to FIG. 2, a list of phoneme sequences is identified to be used for searching an audio file (step 200). Initially, a list of all existing phoneme sequences in the language of the file is compiled. For instance, there are about 40 phonemes in the English language. If short sequences of phonemes (e.g., single phonemes or bi-phoneme sequences) were used to search the audio file, there would be a high risk of obtaining inaccurate search results. Although searching for longer sequences of phonemes would produce more accurate results, the list of possible phoneme sequences to be searched could become prohibitively large. To balance these two competing pressures, audio files are search for tri-phones (i.e., sequences of three phonemes). In English, a list of all possible tri-phone sequences results in about 68,000 search terms. This list can be reduced by omitting any phoneme sequences that are unlikely to occur in the given language. In English, this reduction reduces the list of searchable terms to about 10,000 sequences that can reasonably be expected to occur in the searchable audio. In other embodiments, audio files may be searched for quad-phones (i.e., sequences of four phonemes), with the list of searchable phonemes again reduced by omitting unlikely or impossible sequences.

Based on the list of searchable phoneme sequences, a phonetic frequency index (PFI) is constructed for the audio file (step 202). To do so, the file is first broken into smaller segments (step 204). For instance, the phonetic features of the file may be grouped such that the transitions between segments occur at phonetically natural points. This may be done, for example, by leveraging existing technology for detecting voice activity boundaries. A voice activity detector set to a relatively high level of granularity can be used in order to create one audio segment for every region of voice activity. Another option for breaking the file into smaller chunks is to break the file into a set of fixed length segments. However, without knowledge of the boundaries of spoken content, there is a risk of segmenting the audio within a phoneme sequence.

For each segment, the frequency of each searchable phoneme sequence is the determined as follows (step 206):

$$pf_{i,j} = \frac{n_{i,j}}{d_j},$$

where $n_{i,j}$ is the sum of the scores of the considered phoneme sequence $p_i$ in segment $s_j$ and $d_j$ is the duration of the segment $s_j$. The inclusion of the segment duration normalizes longer segments and helps prevent favoring repetition. The frequencies of all phoneme sequences for a given segment are stored as a vector, which can be viewed as a "fingerprint" of the phonetic characteristics of the segment. This fingerprint is used by later processes as a basis for comparison between segments.

The frequency vectors are combined to create a Phonetic Frequency Index (PFI; step 208), where element (i,j) describes the frequency of phoneme sequence i in segment j:

$$PFI = \begin{bmatrix} pf_{1,1} & \cdots & pf_{1,n} \\ \vdots & \ddots & \vdots \\ pf_{i,1} & \cdots & pf_{m,n} \end{bmatrix}.$$

Row i of the PFI is a vector representative of the frequency of phoneme sequence i in each segment:

$$p_i = \lfloor pf_{1,1} \cdots pf_{1,n} \rfloor$$

Similarly, column j of the PFI is a vector representative of the frequency of each phoneme sequence in segment j:

$$s_j = \begin{bmatrix} pf_{1,j} \\ \vdots \\ pf_{m,j} \end{bmatrix}$$

Once the PFI has been determined, the PFI scores are weighted to determine a Weighted Phonetic Score Index (WPSI; step 210). A simple term frequency-inverse document frequency (TF-IDF) technique is used to evaluate the statistical importance of a phoneme sequence within a segment. This technique reduces the importance of phoneme sequences that occur in many segments. The Inverse Segment Frequency ($ISF_i$) can be calculated for phoneme sequence i as follows:

$$ISF_i = \log\frac{|\text{number of segments}|}{|\text{number of segments with } n_{i,j} > 0|}.$$

To calculate the weighted score of the phoneme sequence i, the phonetic frequency $pf_{i,j}$ is multiplied by the Inverse Segment Frequency $isf_i$:

$$pfisf_{i,j} = pf_{i,j} \times isf_i$$

The weighted values are stored in the Weighted Phonetic Score Index.

The segment vector similarity can then be calculated using the WPSI (step 212). In one approach, the phonetic similarity between two segments of audio can be computed by measuring the cosine of the angle between the two segment vectors corresponding to the segments. Given two segment vectors having weighted phonetic scores $S_1$ and $S_2$, the cosine similarity θ is represented using a dot product and magnitude:

$$\cos\theta = \frac{S_1 \cdot S_2}{|S_1||S_2|}$$

In another approach, a Latent Semantic Analysis (LSA) approach can be used to measure similarity. LSA is traditionally used in information retrieval applications to identify term-document, document-document, and term-term similarities.

1.2 Dictionary-Based Analysis

In some embodiments, terms, rather than tri-phones, are used as search objects. The terms may be obtained, for instance, from a dictionary or from a lexicon of terms expected to be included in the audio files. The use of searchable terms instead of tri-phones may reduce the incidence of false positives for at least two reasons. Firstly, the searchable terms are known to occur in the language of the audio file. Additionally, terms are generally composed of many more than three phonemes.

Figure 3:
FIG. 3 is an exemplary wordcloud.

In some embodiments, an importance score is calculated for each term present in a set of media (e.g., an audio segment, an audio file, or a collection of audio files). The score may reflect the frequency and/or relevancy of the term. Once each term has been assigned an importance score, the set of media can be represented as a wordcloud in which the size of each term (vertical font size and/or total surface area occupied by a term) is linearly or non-linearly proportional to the score of the term. For instance, referring to FIG. 3, a wordcloud 300 representing an audio file shows that the terms "more information" and "unified communications" have the highest importance scores in that audio file.

Given two wordclouds $W_1$ and $W_2$, the similarity between the media sets they represent can be computed by applying a distance metric D. For instance, a set T can be defined to represent the union set of terms in $W_1$ and terms in $W_2$. For each term t in the set T, a term distance $d_t$ can be computed as $d_t=|S_{t,1}-S_{t,2}$, where $S_{t,i}$ is the score of term t in wordcloud $W_i$. The overall distance between wordclouds can then be computed as follows:

$$D(W_1 \cdot W_2) = \sum_t w_t \cdot d_t,$$

where $w_t$ is a weighting or normalization factor for term t.

1.3 File-to-File Similarity

The above approaches result in a matrix of segment-to-segment similarity measurements. Using the information about which sections (e.g., which segments or sets of consecutive segments) of an audio file are similar, a measure of the overall similarity between two audio files can be ascertained. For instance, the following algorithm ranks a set of audio files by their similarity to an exemplar audio file:

```
For each (segment s in exemplar document) {
    Get the top N most similar segments (not in exemplar document)
    For each unique document identifier in similar segments {
        Accumulate each score for the document
    }
}
Sort document identifiers by accumulated score
```

2 Best-Guess Phoneme Analysis

In an alternative approach to determining phonetic similarity, a 'best guess' of the phonetic transcript of a source audio file is determined and used to generate a candidate list of phonemes to search. This technique, described in more detail below, is independent of a dictionary. Additionally, the natural strengths of time-warping and phonetic tolerance in the underlying search process are leveraged in producing a similarity measurement.

Figure 4:
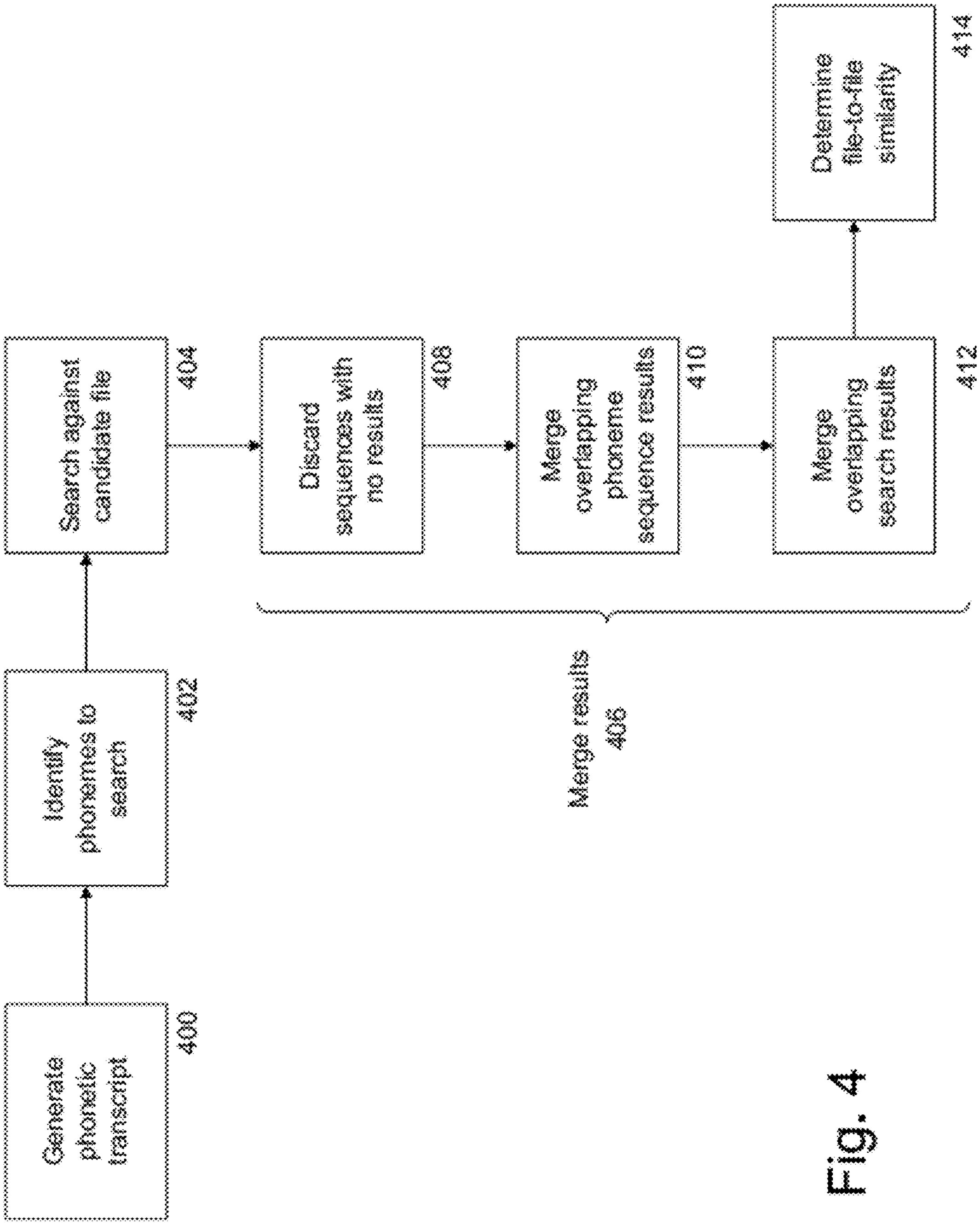
FIG. 4 is a flow chart of a best-guess approach to determining phonetic similarity.

Referring to FIG. 4, by navigating a best-path of the phonemes in a source audio file, a phonetic transcript (i.e., a sequential list of phonemes) can be generated for the file (step 400). Detection of voice activity, silence, and other hints such as gaps in phonemes can be used to improve the selection process. This 'best guess' transcript may be inaccurate as an actual transcript. However, the objective of this transcript is not to exactly reproduce speech-to-text output. Rather, the transcript is used to construct phoneme sequences to be used as search terms.

Because the phonetic transcript is sequential, the phonemes to search can be identified by a windowed selection (step 402). That is, a sliding window is used to select each consecutive constructed phoneme sequence. For each phoneme sequence selected from the source media, a search is execute against other candidate media files (step 404). Results above a predetermined threshold indicative of a high probability of matching, are stored.

The results for each phoneme sequence are then merged (step 406) by identifying corresponding overlaps in start and end time offsets for both the source phoneme sequences and the search results. Any phoneme sequences that do not contain results are first discarded (step 408). Overlapping results of overlapping phoneme sequences are then merged (step 410). For instance, the results for a particular phoneme sequence are merged with the results for any other phoneme sequence whose start offset is after the start offset of the particular phoneme sequence and before the end offset of the particular phoneme sequence. Once the phoneme sequence merge is complete, a similar merging process is performed for the search results themselves (step 412). The score of each merged result is accumulated and a new score is recorded for the merged segment, where high scores between two ranges suggest a high phonetic similarity.

The net result is a list of segments which are deemed to be phonetically similar based on sufficiently high similarity scores. File-to-file similarity can then be calculated (step 414) using coverage scores (e.g., sums of segment durations) and/or segment scores.

3 Use Cases

Any number of techniques can be used to determine a similarity between two audio sources. Three exemplary techniques are described above with reference to sections 1 and 2. Other exemplary techniques are described in U.S. patent application Ser. No. 12/833,244, titled "Spotting Multimedia", the content of which is incorporated herein by reference. Regardless of which approach is used to determine the similarity between two audio sources, the result of such determination can be used in a number of contexts for further processing.

In one example use case, the result can be used to enable any online programming that previously aired on television to be easily and quickly captioned. Suppose, for example, an uncaptioned clip of a television program is placed online by a television network as a trailer for the television program. At any subsequent point in time, the audio track of the uncaptioned television program clip can be compared against audio tracks in an archive of captioned television programs to determine whether there exists a "match." In this context, a "match" is determined to exist if the audio track of the uncaptioned clip is sufficiently similar to that of a captioned television program in the archive.

If a match exists, a captioning module of the system 100 first extracts any closed captioning associated with the archived television program and time aligns the extracted closed captioning with the clip, for example, as described in U.S. Pat. No. 7,487,086, titled "Transcript Alignment," which is incorporated herein by reference. The captioning module then validates and syncs only the applicable portion of the time aligned closed captioning with the clip, in effect trimming the edges of the closed captioning to the length of the clip. Any additional text content (e.g., text-based metadata that corresponds to words spoken in the audio track of the clip) associated with the archived television program may be further associated with the clip. The captioned clip and its additional text content (collectively referred to herein as an "enhanced clap") can then be uploaded to a website and made available to users as a replacement to the uncaptioned clip.

In another example use case, the result can be used to assist a coast guard listening station in identifying unique distress calls. Suppose, for example, a coast guard listening station is operable to monitor distress calls that are received on an emergency channel for each of a set of geographically dispersed antennas. A system deployed at or in electronic communication with the coast guard listening station may be configured to process the signals received from the set of antennas to determine whether there exists a "match" between pairs or multiples of the signals. In this context, a "match" is determined to exist if a signal being processed is sufficiently similar to that of a signal that was recently processed (e.g., within seconds or a fraction of a second).

If a match exists, an analysis module of the system examines the "matching" signals to determine whether the "matching" signals are time aligned (precisely or within a predefined acceptable range). Any signal that has a time aligned match is considered a duplicate distress call and can be ignored by the coast guard listening station. Note that the required degree of similarity (i.e., threshold) between signals to ignore a signal is set sufficiently high to avoid a case in which two signals have a common first distress signal, but the second signal includes a simultaneous weaker second distress signal.

The approaches described above can be implemented in software, in hardware, or in a combination of software and hardware. The software can include stored instructions that are executed in a computing system, for example, by a computer processor, a virtual machine, an interpreter, or some other form of instruction processor. The software can be embodied in a medium, for example, stored on a data storage disk or transmitted over a communication medium.

It is to be understood that the foregoing description is intended to illustrate and not to limit the scope of the invention, which is defined by the scope of the appended claims. Other embodiments are within the scope of the following claims.

What is claimed is:

1. A method for determining a similarity between a first audio source and a second audio source, the method comprising:

for the first audio source, performing the steps of:

determining, using an analysis module of a computer, a first plurality of segments of the first audio source;

determining, using the analysis module, a first frequency of occurrence for each of a plurality of phoneme sequences in the first audio source;

determining, using the analysis module, a first weighted frequency for each of the plurality of phoneme sequences based on the first frequency of occurrence for the phoneme sequence;

wherein determining the first weighted frequency includes emphasizing phoneme sequences that occur in few segments of the first plurality of segments relative to phoneme sequences that occur in many segments of the first plurality of segments;

for the second audio source, performing the steps of:

determining, using the analysis module, a second plurality of segments of the second audio source;

determining, using the analysis module, a second frequency of occurrence for each of a plurality of phoneme sequences in the second audio source;

determining, using the analysis module, a second weighted frequency for each of the plurality of phoneme sequences based on the second frequency of occurrence for the phoneme sequence;

wherein determining the second weighted frequency includes emphasizing phoneme sequences that occur in few segments of the second plurality of segments relative to phoneme sequences that occur in many segments of the second plurality of segments;

comparing, using a comparison module of a computer, the first weighted frequency for each phoneme sequence with the second weighted frequency for the corresponding phoneme sequence; and generating, using the comparison module, a similarity score representative of a similarity between the first audio source and the second audio source based on the results of the comparing.

2. The method of claim 1, wherein determining the first frequency of occurrence includes, for each phoneme sequence, determining a ratio between a number of times the phoneme sequence occurs in the first audio source and a duration of the first audio source.

3. The method of claim 1, wherein the first weighted frequencies for each first portion of audio are collectively represented by a first vector and the second weighted frequencies for each second portion of audio are collectively represented by a second vector.

4. The method of claim 3, wherein the step of comparing includes determining a cosine of an angle between the first vector and the second vector.

5. The method of claim 1, wherein the step of comparing includes using a latent semantic analysis technique.

6. The method of claim 1, wherein the first audio source forms a part of a first audio file and the second audio source forms a part of a second audio file.

7. The method of claim 1, wherein the first audio source is a first segment of an audio file and the second audio source is a second segment of the audio file.

8. The method of claim 1, further comprising selecting the plurality of phoneme sequences.

9. The method of claim 8, wherein the plurality of phoneme sequences are selected on the basis of a language of at least one of the first audio source and the second audio source.

10. The method of claim 1, wherein each phoneme sequence includes three phonemes.

11. The method of claim 1, wherein each phoneme sequence includes a plurality of words.

12. The method of claim 11, further comprising determining a relevance score for each word in the first audio source.

13. The method of claim 12, wherein the relevance score for each word is determined based on a frequency of occurrence of the word in the first audio source.

14. A method for determining a similarity between a first audio source and a second audio source, the method comprising:

generating, using a computer, a phonetic transcript of the first audio source, the phonetic transcript including a list of phonemes occurring in the first audio source;

selecting a plurality of sequences of phonemes from the list of phonemes, each sequence of phonemes being associated with a time interval in the first audio source;

searching, using the computer, the second audio source to identify occurrences of each of the plurality of sequences of phonemes, each identified occurrence being associated with a time interval in the second audio source and a search score;

forming a set of merged sequences of phonemes including merging at least some sequences of phonemes of the plurality of sequences of phonemes with overlapping time intervals;

forming a set of merged occurrences of sequences of phonemes including merging occurrences of sequences of phonemes with overlapping time intervals, including for each merged occurrence, forming an associated score by accumulating the search scores associated with the occurrences and forming an associated time duration by accumulating time durations associated with the occurrences;

and generating, using the computer, a score representative of a similarity between the first audio source and the second audio source, based on one or both of: the scores associated with the merged set of occurrences of sequences of phonemes and the time durations associated with the merged set of occurrences of sequences of phonemes.

15. The method of claim 14, wherein the phonetic transcript includes a sequential list of phonemes occurring in the first audio source.

* * * * *